No. 662,542. Patented Nov. 27, 1900.
C. S. MORSE.
DEVICE FOR CUTTING TUBULAR METAL SHELLS.
(Application filed Oct. 31, 1899.)
(No Model.)
3 Sheets—Sheet 2.
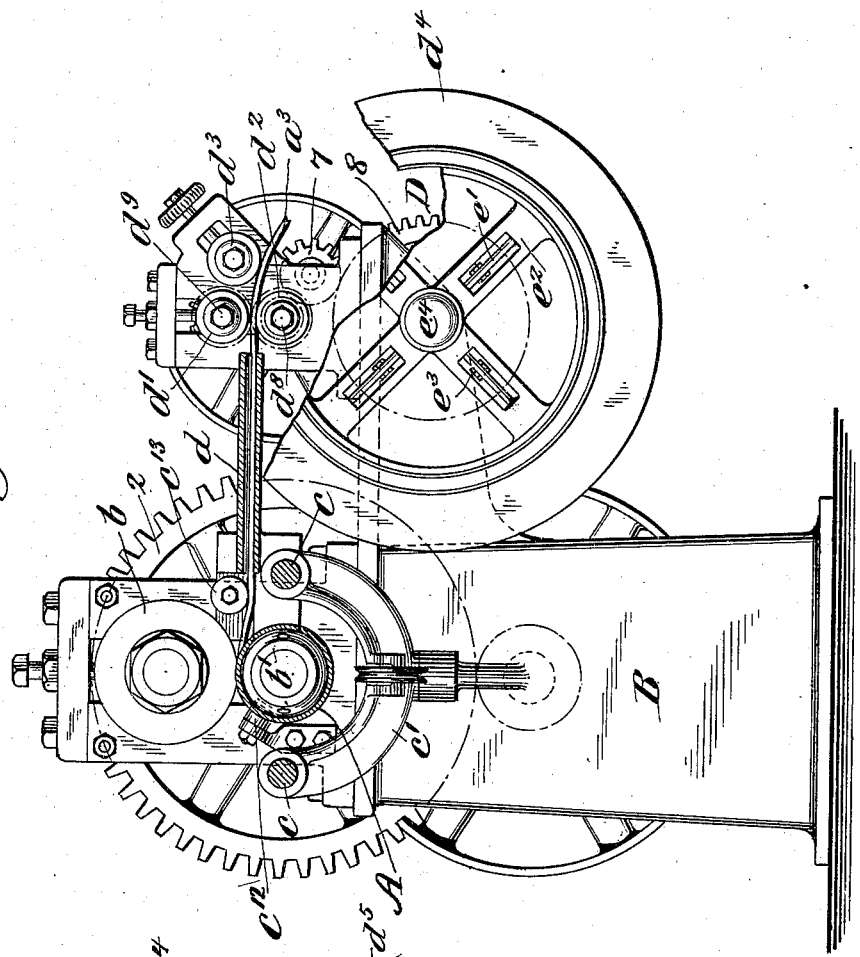
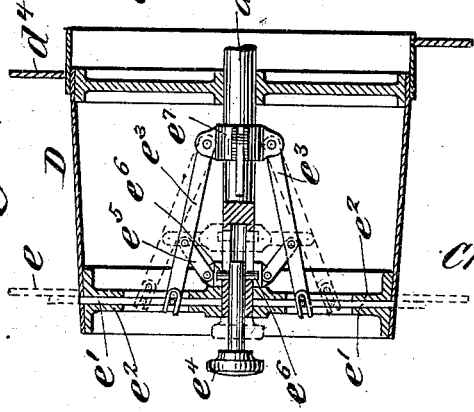
WITNESSES:
INVENTOR
Charles S. Morse
BY
HIS ATTORNEY No. 662,542. Patented Nov. 27, 1900.
C. S. MORSE.
DEVICE FOR CUTTING TUBULAR METAL SHELLS.
(Application filed Oct. 31, 1899.)
(No Model.) 3 Sheets—Sheet 3.
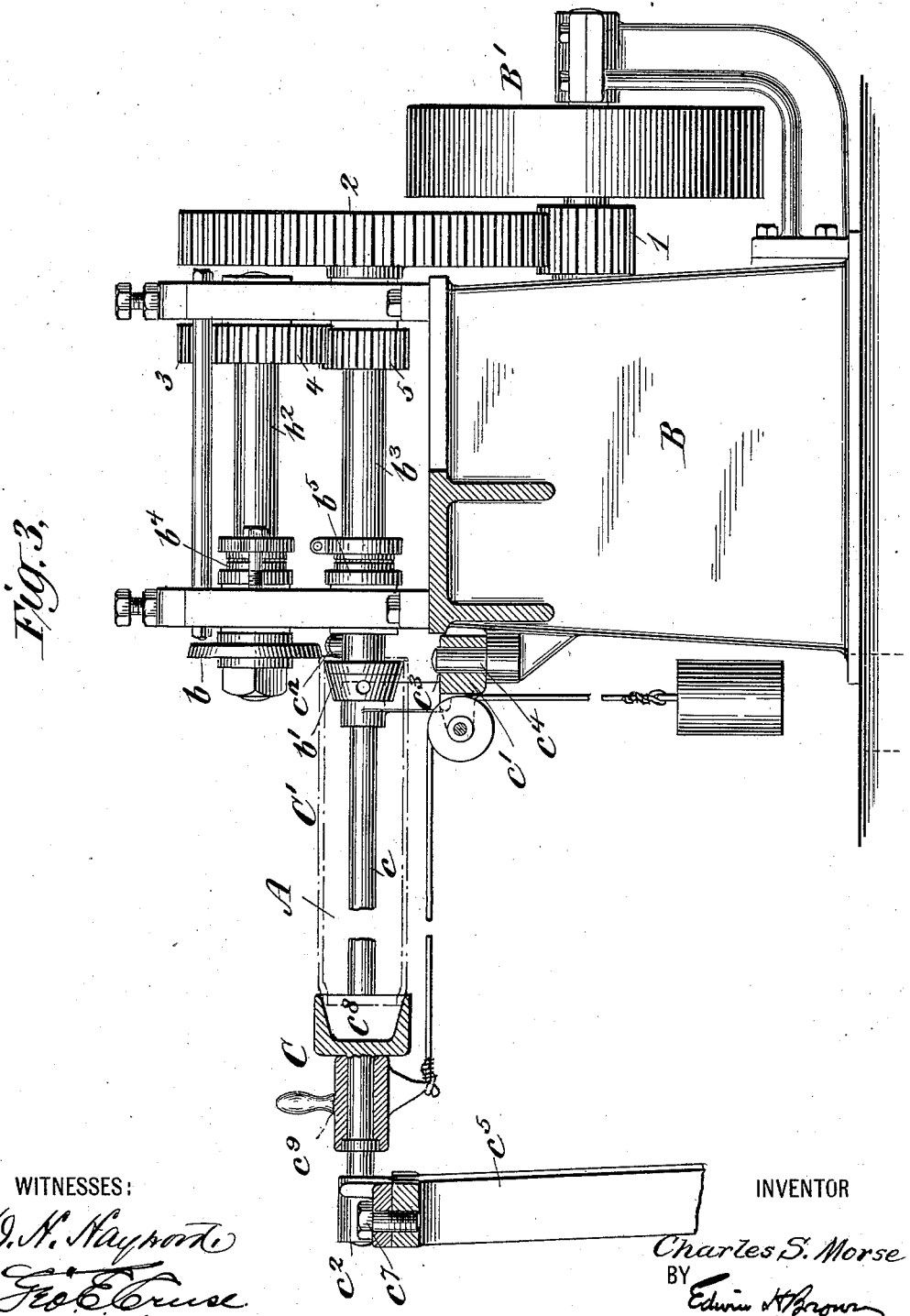
WITNESSES:
INVENTOR
Charles S. Morse
BY
HIS ATTORNEY

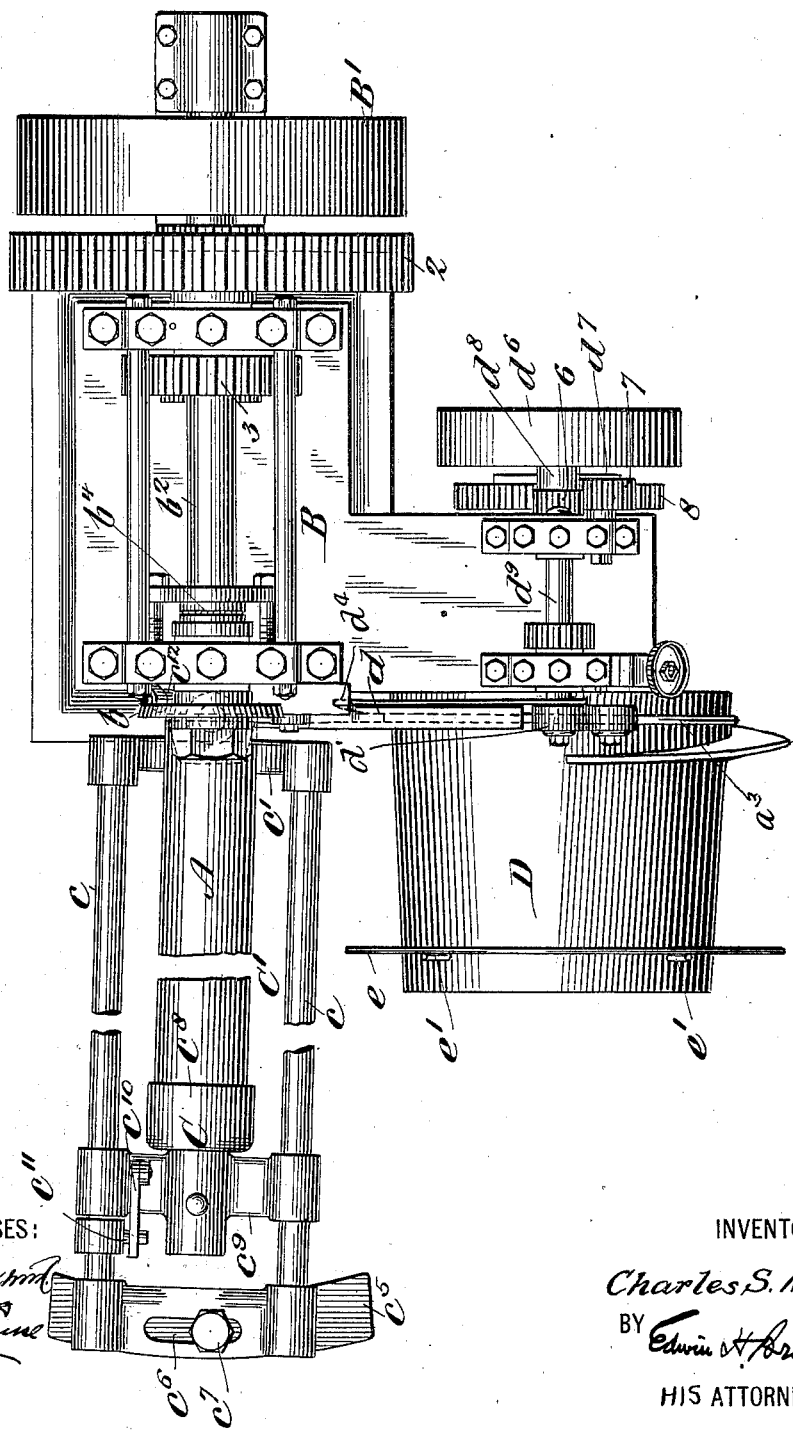

UNITED STATES PATENT OFFICE.

CHARLES S. MORSE, OF WATERBURY, CONNECTICUT, ASSIGNOR TO THE BENEDICT & BURNHAM MANUFACTURING COMPANY, OF SAME PLACE.

DEVICE FOR CUTTING TUBULAR METAL SHELLS.

SPECIFICATION forming part of Letters Patent No. 662,542, dated November 27, 1900.

Application filed October 31, 1899. Serial No. 735,370. (No model.)

*To all whom it may concern:*

Be it known that I, CHARLES S. MORSE, a citizen of the United States, residing at Waterbury, in the county of New Haven and State of Connecticut, have invented a certain new and useful Device for Cutting Tubular Metal Shells, of which the following is a specification.

My invention relates to a device or machine for cutting tubular metal shells to render them non-tubular. I will describe a device embodying my invention and then point out the novel features thereof in the claims.

In the accompanying drawings, Figure 1 is a top view of a device for cutting tubular metal shells embodying my invention. Fig. 2 is an end elevation of the device shown in Fig. 1. Fig. 3 is a side elevation, partly in vertical section. Fig. 4 is a detail sectional view of a part of the machine.

Similar characters of reference designate corresponding parts in all the figures.

A represents a tubular metal shell, and $a^3$ a continuous strip into which the shell is converted. This is done, preferably, by means of a pair of cutter-disks $b\ b'$, carried by shafts $b^2\ b^3$, which are suitably journaled above a bed-plate or other base B. The cutters are so arranged relatively to each other as to shear the metal, and the lower disk $b'$ also serves as a bearing for one end of the shell A. The other end of the shell is supported in a carrier C, which is so mounted as to move longitudinally of an adjustable frame C'. By having this frame adjustable I am enabled to feed the shell A to the cutter-disks at an incline, thereby enabling the cutters to cut the shell spirally. The strip $a^3$ is taken up by a device which arranges it in a coil.

The shafts $b^2\ b^3$ are rotated from the pulley B' by means of the gears 1, 2, 3, 4, and 5, the gears 3, 4, and 5 being of such size as to permit of the cutter-disks $b\ b'$ having the same surface speed should they be of different sizes. The shafts $b^2\ b^3$ are also adjustably mounted in their bearings, and this adjustment of the shafts and the cutter-disks carried thereby permits of shells of different thicknesses of metal being cut by them. These shafts are also provided with thrust-bearings $b^4\ b^5$ of any well-known construction.

The frame C' comprises the pair of horizontal rods $c$, which are connected at one of their ends by means of a yoke $c'$ and at their other ends by means of a cross-piece $c^2$. The yoke $c'$ is provided with an opening $c^3$, in which fits a stud or projection $c^4$. This arrangement of parts forms a swivel-bearing for one end of the frame C'. The cross-piece $c^2$ is supported on a suitable base $c^5$, and it is provided with a slot $c^6$, through which a bolt $c^7$, carried by said base $c^5$, projects. The slot and bolt serve as a means for holding the frame C' in any adjusted position. The carrier C comprises a socket $c^8$, in which the end of a shell is held, and a yoke $c^9$, the ends of which slide on the rods $c$. The carrier is moved toward the cutter-disks to feed the metal shell thereto, and this may be done by means of a cord and weight. The carrier is held against the action of the weight at the time when a new shell is to be arranged in the machine by any suitable means—as, for example, a pivoted hook $c^{10}$, which engages with a fixed projection $c^{11}$. In order to prevent the shell being fed too far forward, a roller $c^{12}$, carried by the base B, is provided near the cutter-disks. This roller may be an adjustable one and serve to regulate the width of the strip into which the shell is to be converted.

By having the frame C' adjustable I am enabled to regulate the pitch of the cut. This is an important advantage, for the reason that in the formation of the tubular shell the fibers of the metal are spirally arranged and the pitch of the spiral can in a measure be controlled during the shell's formation. It will be seen, therefore, that if the shell is cut on the same pitch of the fibers of the shell the reduction of the cross-section is more easily accomplished and better results obtained. As the shell is cut into a strip a roller $c^{13}$ guides it to a channel or conduit $d$, and as it exits from the channel it passes between the rolls $d'\ d^2$. These rolls tend to straighten the strip and also to draw it through the channel and away from the cutters. A roll $d^3$, which is adjustable, serves to guide the strip downward onto a coiling-drum D. A flange $d^4$, that is spirally arranged about the drum, serves to feed the strip forward on the drum and arrange it in a coil thereon.

The drum D is fixed to a shaft $d^5$, which is suitably journaled in an extension of the base B. This shaft is driven by means of a pulley $d^6$ and intermediate gears 6, 7, and 8. The gear 8 is loose on the shaft $d^5$, and motion is preferably communicated to the shaft from the gear 8 by means of a friction device $d^7$ of any well-known construction. The pulley $d^6$ is fixed to the shaft $d^8$, on which the roll $d^2$ is fixed, and motion is communicated from this shaft to the shaft $d^9$, carrying the roll $d'$, by means of the gears 6, 7, and 8. The shafts $d^8$ and $d^9$ are adjustable.

The drum D is shown as tapered to enable the strip $a^3$ to be removed. The strip is prevented from leaving the drum by means of a ring $e$. This ring is removable from the drum, and it is held thereon by means of pins $e'$, which project through openings provided in the wall of the drum. These pins have a sliding bearing in the radial arms $e^2$ of the drum, and they are reciprocated by means of the links $e^3$, which are pivoted to a sleeve $e^7$, fixed to the shaft $d^5$. The links $e^3$ are moved by the links $e^5$, which are connected to a sliding head $e^6$, a rod and handle $e^4$ serving to reciprocate said head $e^6$.

The operation of the device, briefly stated, is as follows: The shell A is placed in position in the frame and the carrier C released in order that it may be moved forward by the weight to feed the shell. Prior to the device being put in operation the frame C' is adjusted so as to be inclined to the cutter-disks, as shown in Fig. 1. The amount of the inclination to be given the frame is determined by the pitch of the fibers in the metal shell. This inclination also permits of the cutter-disks giving a spiral cut to the shell. The device is then started and the shell reduced to a strip, which is arranged or wound in a coil by the coiling device. The strip in this shape is what is termed "stock" metal and is ready for further treatment. The strip is designed particularly for stock from which wire may be produced in any of the well-known ways.

It will be seen, therefore, that my invention comprises means, first, for rendering a tubular shell non-tubular by cutting it into a metal strip; second, means for supporting the shell and feeding it to the cutting means; third, adjusting said feeding and supporting means, or either, in order to determine the pitch of the cut to be given the shell, and, fourth, means for receiving the strip and arranging it so that it can be easily handled.

What I claim as my invention is—

1. The combination of a carrier supported on a frame and movable longitudinally thereof for supporting one end of a metallic shell, cutter-disks for cutting said shell one of said disks serving as a bearing for the other end of said shell, and means for moving the carrier toward the cutter-disks, substantially as described.

2. The combination of rotary cutters, means for supporting a metallic shell said means comprising a frame pivotally supported at one end and adjustable laterally at its opposite end, a carrier movable longitudinally of said frame, and means for adjusting said frame.

3. In a device for cutting shells of metal, the combination of cutter-disks between which the shell is cut, an adjustable frame, a socket upon the frame for supporting one end of the shell, means for moving said socket toward the cutter-disks, and a device for coiling the strip into which the shell is cut.

4. In a device for cutting cylindrical shells, the combination of cutter-disks between which the shell is cut and one of which supports one end of the shell, means for supporting the other end of the shell, means for feeding said shell longitudinally to the cutter-disks, and a device for regulating the amount of said feed.

5. In a device for cutting shells of metal, the combination of cutter-disks between which the shell is cut, means for feeding said shell to the disks, an adjustable frame supporting said means, and a device for regulating the amount of feed of said shell.

6. In a device for cutting shells of metal, the combination of cutter-disks, means for feeding a shell to said disks in order that it may be cut into a continuous strip, a drum onto which said strip is wound, a spirally-arranged flange at one end of said drum for winding the strip into a coil, and a removable flange at the opposite end of the drum, substantially as described.

In testimony whereof I have signed my name to this specification in the presence of two subscribing witnesses.

CHARLES S. MORSE.

Witnesses:
MATT R. BRONSON,
HENRY W. MINOR.